United States Patent [19]
Deng et al.

[11] Patent Number: 5,931,022
[45] Date of Patent: Aug. 3, 1999

[54] AIR PURIFICATION PROCESS WITH THERMAL REGENERATION

[75] Inventors: Shuguang Deng, Stirling, N.J.; Ravi Kumar, Allentown, Pa.; Ravi Jain, Bridgewater, N.J.

[73] Assignee: The BOC Group, Inc., Murray Hill, N.J.

[21] Appl. No.: 08/940,320

[22] Filed: Sep. 30, 1997

[51] Int. Cl.[6] .................................................. F25J 1/00
[52] U.S. Cl. .................................. 62/643; 62/908; 95/96
[58] Field of Search ........................... 62/643, 908; 95/96

[56] References Cited

U.S. PATENT DOCUMENTS

| | | | |
|---|---|---|---|
| 2,882,998 | 4/1959 | Grenier | 62/908 |
| 4,671,813 | 6/1987 | Yoshino | 62/908 |
| 4,957,523 | 9/1990 | Zarate et al. | 62/908 |
| 5,220,796 | 6/1993 | Kearns | 62/908 |
| 5,232,474 | 8/1993 | Jain | 62/908 |
| 5,398,513 | 3/1995 | Klobucar | 62/908 |
| 5,425,242 | 6/1995 | Dunne et al. | 62/908 |
| 5,505,050 | 4/1996 | Arriulou et al. | 62/908 |
| 5,689,974 | 11/1997 | Fujita et al. | 62/908 |

*Primary Examiner*—Ronald Capossela
*Attorney, Agent, or Firm*—Coleman R. Reap; Salvatore P. Pace

[57] ABSTRACT

An activated alumina adsorbent used in a PSA air prepurification process for removal of carbon dioxide from the air is thermally regenerated when the carbon dioxide content remaining in the adsorbent following an adsorbent regeneration step of the PSA process reaches a certain level.

14 Claims, 1 Drawing Sheet

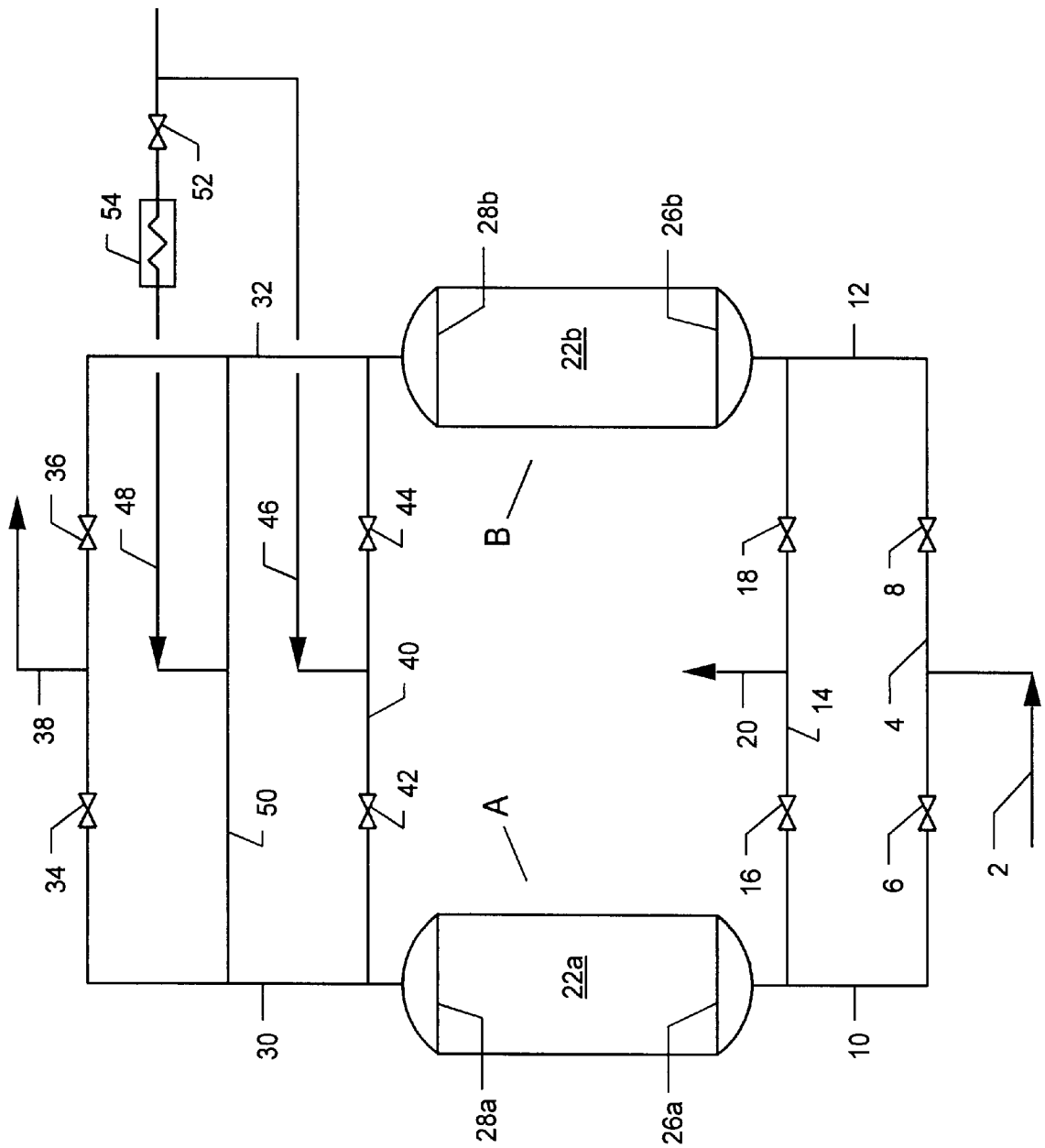

AIR PURIFICATION PROCESS WITH THERMAL REGENERATION

FIELD OF THE INVENTION

This invention relates to the purification of gas streams and more particularly to the removal of carbon dioxide from gas streams by adsorption. Specifically, the invention relates to the purification of air by the removal of water vapor and carbon dioxide therefrom by a pressure swing adsorption process with periodic thermal regeneration of the adsorbent.

BACKGROUND OF THE INVENTION

In many industrial processes using a gaseous feed stream it is desirable or necessary to remove carbon dioxide from the gaseous feed stream prior to certain steps of the processes. For example, in the separation of atmospheric air into its component parts by cryogenic distillation, it is necessary to prepurify the air by removing carbon dioxide and water vapor therefrom prior to refrigerating the air; otherwise, these impurities would condense and freeze in the refrigeration heat exchange equipment and eventually clog the equipment, thereby necessitating removal of the equipment from service for removal of the frozen carbon dioxide and ice. The carbon dioxide and water vapor can be removed from the air by a number of techniques, including the use of pairs of reversing heat exchangers that are operated alternately, such that one heat exchanger is in purification service while the other is undergoing frozen carbon dioxide and ice removal, and pressure swing adsorption (PSA) and temperature swing adsorption (TSA) processes.

A very effective PSA method for removing carbon dioxide and water vapor from gas streams involves the use of activated alumina as the sole adsorbent for removing both carbon dioxide and water vapor from gas streams. This process is disclosed in U.S. Pat. No. 5,232,474, the disclosure of which is incorporated herein by reference. Although this method is superior to other prior art methods of prepurifying air, the activated alumina adsorbent is not very effective for reducing the concentration of carbon dioxide in air down to very low levels, for example <<1 ppm, when the activated alumina adsorbent is contaminated by even a very low level of water vapor. Therefore, a large amount of activated alumina adsorbent is required to produce high purity air, resulting in a substantial increase in the cost of the PSA air purification process. Furthermore, the PSA air purification process is very vulnerable to upset operation when excessive water vapor and/or liquid water are introduced into the activated alumina-containing vessels. Once the PSA process is upset, the adsorbent performance will deteriorate, and carbon dioxide may break through into the purified gas stream. Under normal PSA operating conditions it may take as long as one year for the bed to restore itself to satisfactory performance.

It would be desirable to improve the efficiency of activated alumina-based PSA processes for the removal of low levels of carbon dioxide from gas streams. The present invention provides such an improvement.

SUMMARY OF THE INVENTION

This invention uses a cyclic PSA process with periodic thermal regeneration of the adsorbent to remove carbon dioxide (and any water vapor present) from a gas stream. The PSA step uses a bed of activated alumina as the adsorbent. The activated alumina removes substantially all of the carbon dioxide and substantially all of any water vapor contained in the gas stream The broad embodiment of the invention comprises a method of removing carbon dioxide from a gas by a cyclic pressure swing adsorption process comprising an adsorption step and an adsorbent regeneration step carried out in an adsorption zone containing activated alumina, and further comprising periodically interrupting said cyclic pressure swing adsorption process and subjecting said activated alumina to thermal regeneration by heating it sufficiently to remove substantially all carbon dioxide and water vapor therefrom. In a preferred embodiment, the gas is air.

The thermal regeneration is carried out by heating the activated alumina to a temperature above the temperature at which adsorption takes place, and pereferably to a temperature in the range of about 50 to about 300° C., and it is most preferably carried out by heating the activated alumina to a temperature in the range of about 100 to about 250° C., particularly when the gas being purified is air.

The activated alumina is preferably thermally regenerated by passing a heated substantially carbon dioxide-free and water vapor-free purge gas through the activated alumina.

Where the gas contains water vapor, substantially all of the water vapor is removed therefrom during the cyclic pressure swing adsorption process.

Generally, the pressure in the adsorption zone during the adsorption step is maintained in the range of about 1.5 to about 50 bara. During the adsorbent regeneration step, the pressure in the adsorption zone is often reduced to about 0.15 to about 2 bara.

The temperature in the adsorption zone is generally maintained in the range of about 0 to about 60° C. during the adsorption step, and usually also during the adsorbent regeneration step.

The activated alumina is often purged with a substantially carbon dioxide-free and water vapor-free gas during at least part of said adsorbent regeneration step.

In a preferred embodiment of the invention, the pressure swing adsorption process is carried out in a system comprising a pair of adsorption zones containing activated alumina and operated 180° out of phase, such that when one adsorption zone is in adsorption service the other adsorption zone is undergoing adsorbent regeneration. In this case, it is preferable to thermally regenerate the activated alumina in both adsorption zones together, i.e. at the same time.

When air is purified by the cyclic pressure swing adsorption process the substantially water vapor-free and carbon dioxide-free air produced by the process can be subjected to a cryogenic distillation process, thereby producing one or both of a nitrogen-enriched product and an oxygen-enriched product. In this case, the activated alumina is preferably thermally regenerated by passing therethrough a heated waste gas stream from said cryogenic distillation process.

BRIEF DESCRIPTION OF THE DRAWING

The drawing FIGURE is a schematic representation of a system in which a preferred embodiment of the invention is carried out. Valves, lines and equipment that are not necessary for an understanding of the invention have not been included in the drawing.

DETAILED DESCRIPTION OF THE INVENTION

PSA is a well known process for separating the components of a mixture of gases by virtue of the difference in the degree of adsorption among them on a particulate adsorbent. Typically, the process is carried out in one or more beds which are operated in a cycle which includes an adsorption step and a bed regeneration step. The process is often carried out in pairs of adsorbent beds arranged in parallel and cycled 180° out of phase, such that one bed is in the adsorption mode while the other bed is undergoing bed regeneration. This provides a pseudo-continuous flow of the desired product or products, which may be obtained during either or both phases of the process. The adsorption step may be carried out at atmospheric pressure, but is generally carried out at superatmospheric pressure, and the desorption or bed regeneration step is carried out at a relatively low pressure or under a vacuum. The PSA cycle may contain other steps in addition to the fundamental steps of adsorption and regeneration, such as pressure equalization between a bed which has just completed its adsorption step and another bed which has just completed its bed regeneration step, and partial repressurization with product gas following bed regeneration or bed equalization.

As used herein to describe the condition of a gas stream, the terms "substantially water vapor-free" or "substantially free of water vapor" mean that the gas stream contains less than about 1 ppm water vapor. Similarly, the terms "substantially carbon dioxide-free" or "substantially free of carbon dioxide" mean that the gas stream being described contains less than about 1 ppm carbon dioxide. When "substantially all" of the water vapor and/or "substantially all" of the carbon dioxide are removed from a gas, the gas is substantially free of water vapor and/or substantially free of carbon dioxide. "High purity air" is air that contains less than 1 ppm water vapor and less than 1 ppm carbon dioxide.

The invention will be described as it applies to the prepurification of air by the removal of water vapor and carbon dioxide therefrom, however it is to be understood that the process can be used for the purification of any gas by the removal of carbon dioxide therefrom where the carbon dioxide is more strongly adsorbed than the gas to be purified. The invention can be best understood upon consideration of the appended drawing, which shows a system comprising a pair of adsorption vessels, A and B, arranged in parallel.

In the drawing, line 2 is connected to a source of air. At a point upstream of the system illustrated in the drawing, line 2 may be provided with a compressor and a cooler and moisture condenser (not shown). Line 2 is connected to manifold 4, which is provided with valves 6 and 8, which, in control flow of feed gas into vessels A and B through feed lines 10 and 12, respectively. Exhaust manifold 14 is also connected to lines 10 and 12 via valves 16 and 18, respectively. Adsorbed gas discharge line 20 is also connected to manifold 14. Line 20 may vent directly to the atmosphere or it may be connected to the inlet end of a vacuum pump (not shown).

Vessels A and B each have adsorbent zones 22a and 22b, which are packed with activated alumina. The quantity of activated alumina in layers 22a and 22b is sufficient to remove substantially all of the carbon dioxide and substantially all of any water vapor contained in the gas stream being treated. In the embodiment illustrated in the drawing, vessels A and B are provided with support screens 26a and 26b and top screens 28a and 28b. Screens 26a and 26b are displaced from the bottom of vessel A to provide even distribution of the feed gas entering vessels A and B. Gas collection spaces are provided in vessels A and B above screens 28a and 28b. The outlet ends of vessels A and B are connected to lines 30 and 32, which are respectively provided with valves 34 and 36. Lines 30 and 32 join to purified air product line 38 at a point between valves 34 and 36.

Product line 38 may be connected to a cryogenic distillation unit or other air separation equipment (not shown), or to an end use application.

PSA cycle purge gas manifold 40, fitted with valves 42 and 44, is connected to lines 30 and 32. Between valves 42 and 44, manifold 40 is connected to purge gas supply line 46, which is connected to a source of purge gas, such as a waste gas stream from a downstream cryogenic distillation unit. Thermal purge gas supply line 48, at its upstream end, is connected to purge gas supply line 46. At its downstream end line 48 is connected to cross-connection line 50, which, in turn, joins lines 30 and 32. Line 48 is provided with cutoff valve 52 and purge gas heater 54.

Operation of the system will be described with vessel A initially in the adsorption mode and vessel B initially in the bed regeneration mode. During the first phase of the process, valves 6, 18 and 44 are open and all other valves are closed. Atmospheric air is compressed and cooled and introduced into vessel A through lines 2 and 10. When the pressure in vessel A reaches the desired adsorption pressure, valve 34 is opened and gas flows through vessel A at the adsorption pressure. As the feed air passes cocurrently (in the direction from the feed entrance towards the nonadsorbed gas outlet of the vessels) through layer 22a, substantially all water vapor (if the air contains any) and substantially all carbon dioxide contained in the air are adsorbed. The purified air, now substantially free of water vapor and carbon dioxide, passes out of vessel A through line 30 and leaves the system through line 38.

Meanwhile, substantially water vapor- and carbon dioxide-free regeneration gas enters the system through line 46. As noted above, the regeneration gas may be a waste stream from a downstream cryogenic distillation unit or other air separation equipment. The regeneration gas flows through manifold 40 and line 32, and then flows countercurrently (in the direction opposite to the flow of feed gas through the vessels) through the layer of activated alumina in vessel B, and as it does so, it desorbs water vapor and carbon dioxide therefrom. The purge gas, together with the gas components desorbed from the adsorbent, pass out of vessel B and leave the system through line 20.

As the PSA adsorption step proceeds, the adsorption front in layer 22a advances toward the outlet end of vessel A. When it reaches a predetermined point in layer 22a, the first phase of the PSA cycle is terminated and the second phase is started. During the second phase vessel B, which has completed its PSA adsorbent regeneration phase, is put into adsorption service and the activated alumina in vessel A is regenerated. Upon termination of the first phase, the changeover is initiated by first opening valve 16 to depressurize vessel A and then opening valves 8 and 42. All other valves are closed. Compressed and cooled atmospheric air is now introduced into vessel B through lines 2 and 12. When the pressure in vessel B reaches the desired adsorption pressure, valve 36 is opened and gas flows through vessel B at the adsorption pressure. Feed air now passes cocurrently through layer 22b, where substantially all water vapor in the air and carbon dioxide contained in the air are adsorbed. The purified air, now substantially free of water vapor and carbon dioxide passes out through the top of layer 22b, leaves vessel B through line 32, and passes out of the system through line 38, as in the first phase of the process. Also during this phase, PSA cycle regeneration gas flows through line 46, manifold 40 and line 30 and countercurrently through the layers of activated alumina in vessel A, whereupon it desorbs water vapor and carbon dioxide from the adsorbent. The purge gas, together with the gas components desorbed from the activated alumina, pass out of vessel A through line 10 and leave the system through manifold 14 and line 20.

As the second phase of the PSA process proceeds, the adsorption front in layer 22b advances toward the outlet end of this vessel. When it reaches the predetermined endpoint in layer 22b, the second phase of the PSA cycle is terminated. The PSA cycle is continuously repeated.

The water vapor and carbon dioxide adsorbed by the activated alumina is gradually removed and the activated alumina surface become cleaner and cleaner as the PSA process proceeds; however, the adsorbent clean-up process is so slow that complete removal of all the adsorbed water and carbon dioxide from the activated alumina is actually impossible under normal PSA process conditions. The presence of even low levels of water vapor on the surface of activated alumina makes it very difficult to reduce the concentration of carbon dioxide in gas streams to less than about 1 ppm by PSA using activated alumina as the adsorbent.

It has been observed that even fresh activated alumina adsorbents as received from the manufacturer is contaminated with water vapor and is ineffective for very low level carbon dioxide removal. Furthermore, regenerated activated alumina adsorbent is vulnerable to plant upset operation. Any excessive water vapor or liquid water that finds its way into the adsorption vessel during the adsorption step will contaminate the clean activated alumina surface, cause the adsorbent performance to deteriorate and allow carbon dioxide breakthrough into the purified gas stream. It is recommended that the novel thermal regeneration step of the invention be employed when the activated alumina adsorbents are initially loaded and after upset of the PSA process, or when the carbon dioxide concentration front inside the activated alumina adsorbent vessel reaches a predetermined limit.

Accordingly, the activated alumina adsorbent is preferably thermally regenerated before being used in PSA processes and/or when, during the PSA process, the carbon dioxide front remaining in the activated alumina layer in one or in each vessel of the adsorption system reaches the point at which more thorough adsorbent regeneration is desirable or necessary. This is accomplished by opening valves 16, 18 and 52 and activating heater 54. All other valves of the system are maintained in the closed position. Heated purge gas now flows through heater 54 and lines 48, 50, 30 and 32 and passes countercurrently through vessels A and B. As the hot purge gas passes through the activated alumina in vessels A and B, it desorbs residual carbon dioxide and water vapor from the adsorbent. The purge gas, together with desorbed carbon dioxide and water vapor, passes out of the adsorbent in vessels A and B, leaves these vessels through lines 10 and 12, respectively, and passes out of the system through manifold 14 and line 20. When the activated alumina in vessels A and B are regenerated to the desired extent, which may take several hours or days, the thermal regeneration procedure is terminated and the PSA process is resumed.

By practicing the adsorption process in the manner described above, efficient operation of the system can be easily achieved to consistently produce purified gas that contains as little as 1 ppm carbon dioxide and water vapor, and, in fact, the system can be easily operated to produce air containing about 3 ppb or less carbon dioxide and water vapor.

It will be appreciated that it is within the scope of the present invention to utilize conventional equipment to monitor and automatically regulate the flow of gases within the system so that it can be fully automated to run continuously in an efficient manner.

The process of the invention is primarily intended for use in processes in which the activated alumina is the sole carbon dioxide-selective adsorbent used in the system, as is the case in the process described in U.S. Pat. No. 5,232,474, discussed above, however it can be practiced with multiple adsorbent systems which contain activated alumina in a first layer or bed and another carbon dioxide-selective adsorbents in a second layer or bed.

The invention is further illustrated by the following example in which, unless otherwise indicated, parts, percentages and ratios are on a volume basis.

EXAMPLE 1

Atmospheric air was purified in a laboratory-scale pressure swing adsorption system consisting of two identical vertical cylindrical stainless steel vessels 86.5 inches high and having an internal diameter of 5.24 inches. The vessel was packed with 4 inches of ceramic balls at the bottom and 82.5 inches of 7×12 mesh beads of activated alumina (sold by LaRoche Industries, Inc. under the trade designation A-201). The PSA cycle included as steps: pressurization to 5 bara, 250 sec.; adsorption at 5 bara, 770 sec.; depressurization to 1 bara, 50 sec.; and purge regeneration at 1.1 bara, 470 sec. The gas flow rates during the adsorption and purge regeneration steps was 13.6 scfm, and 11.5 scfm, respectively. The pressurization step was carried out by charging carbon dioxide-free and water vapor-free nitrogen into the adsorption vessel. During the adsorption step compressed air saturated with water vapor and containing 350–400 ppm carbon dioxide was passed upwardly through the adsorption vessel at about 25° C. Purge regeneration was carried out by passing water vapor-free and carbon dioxide-free nitrogen through the adsorption vessel at about 25° C. During the process the carbon dioxide and water vapor content at various levels of the adsorption vessel were measured using a carbon dioxide analyzer (Horiba, model GA-360) and a moisture analyzer (Panametrics, Series 3), respectively.

The above-described PSA cycle was repeated continuously more than 4500 times. It was found that both $CO_2$ and water vapor concentration in the purified air streams from bed heights of 80 inches and above were below the carbon dioxide and water vapor detection limits.

The adsorbent specific product (calculated using the equation: feed flow rate×feed time/adsorbent weight needed to produce air containing not more than about 3 ppb carbon dioxide) was about 3.88 scf/lb of activated alumina.

EXAMPLE 2

Example 1 was repeated except that the activated alumina adsorbent used in Example 1 was initially baked at 100 C., under a nitrogen flow for 20 hours. The PSA experimental conditions are identical to those described in Example 1.

The PSA cycles were repeated for more than 500 times. It was found that both carbon dioxide and water vapor concentration in the purified air streams from bed heights of 40 inches and above were below the carbon dioxide and water vapor detection limits. The adsorbent specific product (calculated using the equation: feed flow rate×feed time/adsorbent weight needed to produce air containing not more than about 3 ppb carbon dioxide) was about 8.0 scf/lb of activated alumina.

The initially baked activated alumina adsorbent generates more than double the adsorbent specific products that the unbaked activated alumina generates. This suggests that using initially and periodically baked activated alumina for air purification by PSA will reduce the adsorbent vessel size necessary to produce high purity air.

Although the invention has been described with particular reference to specific equipment arrangements and to specific experiments, these features are merely exemplary of the invention and variations are contemplated. For example, The PSA section of the system may contain a single adsorption vessel or it may contain three or more adsorption vessels arranged in parallel and operated in sequence. Furthermore, the beds of the PSA system can be operated in a vacuum swing adsorption (VSA) cycle with adsorption carried out at or above atmospheric pressure and bed regeneration conducted under a vacuum, with or without a purge. The PSA cycle may include steps other than adsorption and regeneration. For example, it may include a pressure equalization step. Also, if desired repressurization of the adsorption vessels after regeneration can be accomplished by introducing product gas into the adsorption vessel A instead of feed gas. The PSA process of the invention can be practiced using activated alumina as the sole carbon dioxide-selective adsorbent, or it can be practiced using a combination of activated alumina and other carbon dioxide-selective adsorbents in a single layer or in multiple layers. The scope of the invention is limited only by the breadth of the appended claims.

What is claimed is:

1. In a method of removing carbon dioxide from a gas by a cyclic pressure swing adsorption process comprising an adsorption step and an adsorbent regeneration step carried out in an adsorption zone containing activated alumina, the improvement comprising subjecting said activated alumina to thermal regeneration by heating it sufficiently to remove substantially all moisture therefrom when said activated alumina is initially loaded into said adsorption zone, after upset of said process, or both when said activated alumina is initially loaded into said adsorption zone and after upset of said process.

2. The method of claim 1, wherein said thermal regeneration is carried out by heating said activated alumina to a temperature in the range of about 50 to about 300° C.

3. The method of claim 2, wherein said activated alumina is heated by passing a heated substantially carbon dioxide-free and substantially water vapor-free purge gas therethrough.

4. The method of claim 1, wherein said gas contains water vapor and substantially all of the water vapor is removed therefrom during said cyclic pressure swing adsorption process.

5. The method of claim 1 or claim 4, wherein said gas is air.

6. The method of claim 5 wherein said thermal regeneration is carried out by heating said activated alumina to a temperature in the range of about 100 to about 250° C.

7. The method of claim 5 wherein said pressure swing adsorption process is carried out in a system comprising a pair of adsorption zones containing activated alumina and operated 180° out of phase, such that when one adsorption zone is in adsorption service the other adsorption zone is undergoing adsorbent regeneration.

8. The method of claim 7, wherein the adsorption zones of said system are simultaneously thermally regenerated.

9. The method of claim 7, further comprising subjecting the substantially water vapor-free and carbon dioxide-free air to a cryogenic distillation process, thereby producing one or both of a nitrogen-enriched product and an oxygen-enriched product.

10. The method of claim 9, wherein during at least part of said thermal regeneration said activated alumina is purged with a heated waste gas stream from said cryogenic distillation process.

11. The method of claim 1, wherein the pressure in said adsorption zone during said adsorption step is in the range of about 1.5 to about 50 bara.

12. The method of claim 1 or claim 11, wherein the pressure in said adsorption zone is reduced during said adsorbent regeneration step to about 0.15 to about 2 bara.

13. The method of claim 1 or claim 11, wherein the temperature in said adsorption zone during said adsorption step is in the range of about 0 to about 60° C.

14. The method of claim 1, wherein said activated alumina is purged with a substantially carbon dioxide-free and substantially water vapor-free gas during at least part of said adsorbent regeneration step.

* * * * *